R. A. BEAUSEJOUR.
HOLDER FOR LIQUID COATING MACHINES.
APPLICATION FILED MAR. 30, 1909.
941,607.
Patented Nov. 30, 1909.
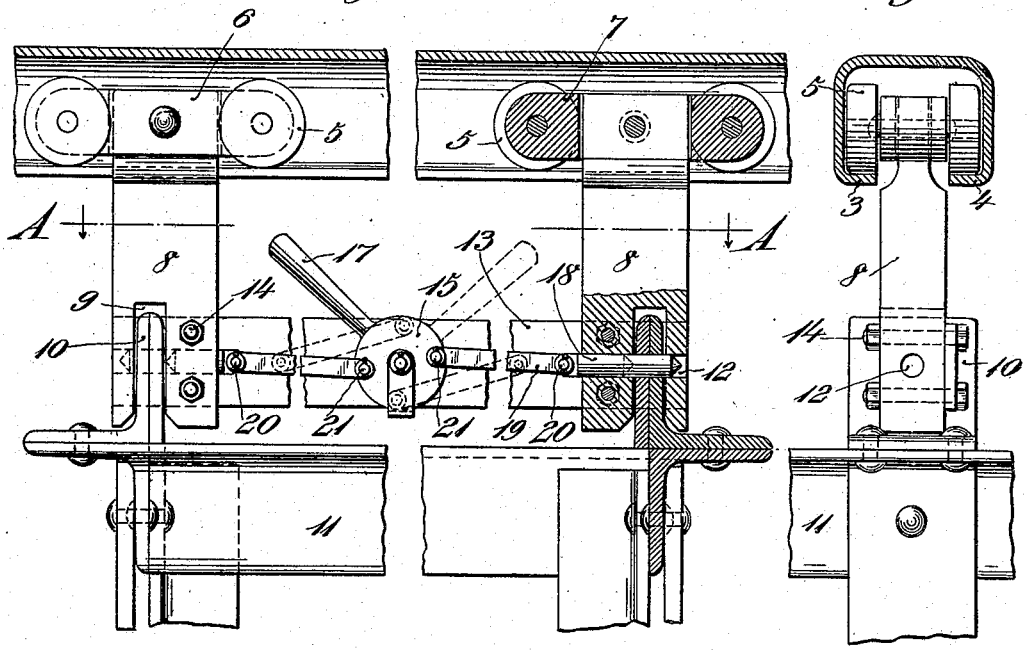
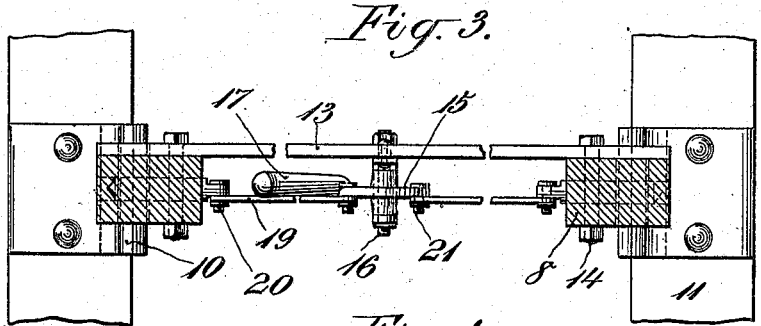
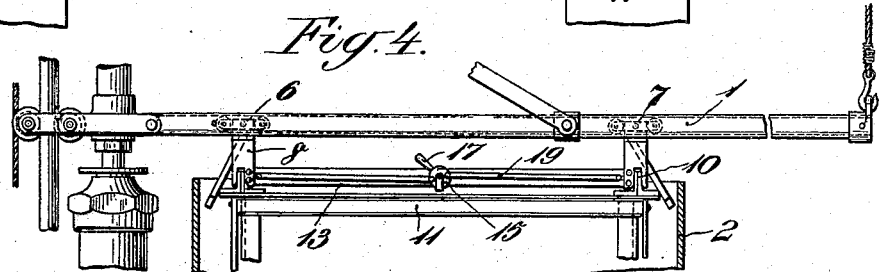

UNITED STATES PATENT OFFICE.

REME A. BEAUSEJOUR, OF NEW YORK, N. Y., ASSIGNOR TO STANDARD VARNISH WORKS, OF NEW YORK, N. Y., A CORPORATION OF NEW YORK.

HOLDER FOR LIQUID-COATING MACHINES.

941,607.     Specification of Letters Patent.     Patented Nov. 30, 1909.

Application filed March 30, 1909. Serial No. 486,789.

*To all whom it may concern:*

Be it known that I, REME A. BEAUSEJOUR, a subject of the Crown of Great Britain, and resident of the borough of Brooklyn, in the city and State of New York, have invented a new and useful Holder for Liquid-Coating Machines, of which the following is a specification.

This invention relates to locking devices for securing the article holders of liquid coating machines to their supporting mechanism, with the object in view of providing a locking device which is simple, yet positive, in its operation, which will securely lock the holder at both sides thereof; and which may be readily applied to any suitable form of holder.

Another object is to provide certain improvements in the form, construction and arrangement of the various parts.

A practical embodiment of my invention is represented in the accompanying drawing in which, Figure 1 is an enlarged detail side view of my invention, partly in section, the locking device being shown in its operative position in dotted lines. Fig. 2 is an end view of the same, the bracket arm being shown in section. Fig. 3 is a section taken in the plane of the line A—A of Fig. 1, looking in the direction of the arrows, and Fig. 4 is a detail side view, partly in section, showing my device in operative position, securing an article holder to the carriages of a supporting mechanism.

The bracket arm of a suitable supporting mechanism is denoted by 1, and the customary dip tank by 2. This arm 1 is of inverted U-shape in cross section, as best shown in Fig. 2, and has inturned edges 3, 4, which form tracks for the wheels 5 of inner and outer carriages 6, 7, fitted to reciprocate within the arm 1. The carriages 6, 7, are provided with the depending arms 8, having longitudinal slots 9 in their lower ends adapted to receive the tongues 10 on the top of the holder 11. The tongues 10 are each provided with transverse holes fitted to register with the transverse holes 12, in the lower portion of the depending arms 8, when the tongues are in position within the slots 9. The carriages 6, 7, are fixedly spaced from each other by means of the rigid brace 13 secured to the arms 8, by the bolts 14.

A crank wheel 15 is rotatably mounted on the lateral projection 16, located about centrally of the brace 13, and is held in position thereon by the usual washer and cotter pin. This crank is provided with a suitable operating handle 17 mounted on the periphery thereof.

Within the holes 12 in the depending arms 8, I locate bolts 18, fitted to enter the holes in the tongue 10, and securely lock them within the slots 9. These bolts are connected to the crank wheel 15 by means of the pitman rods 19, the ends of which are secured to the inner ends of the bolts and to opposite sides of the crank wheel, as indicated at 20 and 21, respectively. When the crank wheel 15 is rotated, by means of the handle 17, in one direction, the bolts are withdrawn toward the crank wheel; and when it is rotated in the other direction, the bolts are projected farther into the holes 12, in the arms 8. This is by reason of the fact that the pitman rods are secured to opposite sides of the crank wheel 15, near its periphery. In the present instance, I have shown each pitman rod as secured to that portion of the edge of the crank wheel which is nearest to its bolt when the latter is in its operative position; but it is evident that the pitman rods might be secured to any other two opposite portions of the crank wheel and still produce the same effect.

In operation, the crank wheel 15 is turned so that the bolts 18 are in their withdrawn position, (indicated in dotted lines in Fig. 1), thus leaving the slots 9 free to receive the tongues 10 of the holder. The article holder 11 is then moved into position so that the tongues 10 enter the slots 9, causing the holes in said tongues to register with the holes 12 in the arms 8. The crank wheel is then operated in the reverse direction, thus projecting the bolts 18 outwardly and causing them to pass through the tongues 10 and lock them in the slots 9, (as indicated in full lines in Fig. 1). This secures the article holder to the carriages within the bracket arm, so that the article holder may be slid longitudinally of the arm 1 and raised and lowered with the arm 1, at will.

By the structure above set forth, I obtain a double locking effect with a single movement, as well as a double support for the article holder.

It is obvious that various changes may be resorted to in the form, construction and arrangement of the different parts of my device without departing from the scope of my invention, hence I do not wish to limit myself strictly to the structure herein shown and described, but

What I claim is:

1. In a liquid coating machine, an article holder, supporting mechanism therefor, and a double lock for securing the article holder to the supporting mechanism, the said lock having its fastening elements in a line longitudinal with respect to the supporting mechanism.

2. In a liquid coating machine, an article holder, supporting mechanism therefor, and means for securing the article holder to the supporting mechanism having a multiple point support on the said supporting mechanism in a line longitudinal with respect thereto.

3. In a liquid coating machine, an article holder, supporting mechanism therefor, a double lock for securing the article holder to the supporting mechanism, and a single device for operating the double lock.

4. In a liquid coating machine, an article holder, supporting mechanism therefor, a plurality of arms depending from said supporting mechanism in a line longitudinal with respect thereto, and locks carried by said arms for securing the article holder to them.

5. In a liquid coating machine, an article holder, supporting mechanism therefor, a plurality of arms depending from said supporting mechanism in a line longitudinal with respect thereto, and a double lock carried by said arms for securing the article holder to them.

6. In a liquid coating machine, an article holder, supporting mechanism therefor, a plurality of arms depending from said supporting mechanism, a double lock carried by said arms for securing the article holder to them, and a single device for operating the double lock.

7. In a liquid coating machine, an article holder, supporting mechanism therefor, a plurality of arms depending from said supporting mechanism, a double lock carried by said arms for securing the article holder to them, and a single device also carried by said arms, for operating the double lock.

8. In a liquid coating machine, an article holder, having tongues thereon, supporting mechanism therefor, a plurality of arms depending from said supporting mechanism, bolts carried by said arms, and means for causing said bolts to engage said tongues for securing the holder to the arms.

9. In a liquid coating machine, an article holder having tongues thereon, supporting mechanism therefor, a plurality of arms depending from said supporting mechanism, bolts carried by said arms, and a single device for causing said bolts to engage said tongues for locking the holder to the arms.

10. In a liquid coating machine, a supporting mechanism, a plurality of arms depending therefrom and provided with longitudinal slots and transverse holes in their lower ends, bolts carried by said arms, an article holder provided with tongues having transverse holes therein and fitted to enter said slots, and means for causing said bolts to enter said holes in said tongues for securing the holder to the said arms.

11. In a liquid coating machine, a supporting mechanism, a plurality of arms depending therefrom and provided with longitudinal slots and transverse holes in their lower ends, bolts mounted in said arms, a brace connecting said arms, an article holder provided with tongues having transverse holes therein and fitted to enter said slots, and means mounted on said brace for projecting said bolts into and withdrawing them from said holes in said tongues for securing and releasing the holder to and from the said arms.

12. In a liquid coating machine, a supporting mechanism, a plurality of arms depending therefrom and provided with longitudinal slots and transverse holes in their lower ends, bolts mounted in said arms, a brace connecting said arms, an article holder provided with tongues having transverse holes therein and fitted to enter said slots, and a single device mounted on said brace for projecting said bolts into and withdrawing them from said holes in said tongues for securing and releasing the holder to and from the said arms.

13. In a liquid coating machine, a supporting mechanism, a plurality of arms depending therefrom and provided with longitudinal slots and transverse holes in their lower ends, bolts mounted in said arms, a brace connecting said arms, an article holder provided with tongues having transverse holes therein and fitted to enter said slots, and means mounted on said brace for projecting said bolts into and withdrawing them from said holes in said tongues for securing and releasing the holder to and from the said arms, said means comprising a crank wheel and pitman rods connected to opposite sides of said crank wheel and to said bolts.

14. In a liquid coating machine, an article holder, a supporting mechanism therefor, inner and outer carriages fitted to reciprocate on said supporting mechanism, arms depending from said carriages, a brace connecting said arms, and means mounted on said brace for securing the article holder to said arms.

15. In a liquid coating machine, a supporting mechanism, inner and outer carriages fitted to reciprocate thereon, arms depending from said carriages and provided with longitudinal slots and transverse holes in their lower ends, bolts mounted in said arms, a brace connecting said arms, an article holder provided with tongues having transverse holes therein and fitted to enter said slots, and means mounted on said brace for projecting said bolts into and withdrawing them from said holes in said tongues for securing and releasing the holder to and from the said arms.

16. In a liquid coating machine, a supporting mechanism, inner and outer carriages fitted to reciprocate thereon, arms depending from said carriages and provided with longitudinal slots and transverse holes in their lower ends, bolts mounted in said arms, a brace connecting said arms, an article holder provided with tongues having transverse holes therein and fitted to enter said slots, and a single device mounted on said brace for projecting said bolts into and withdrawing them from said holes in said tongues for securing and releasing the holder to and from the said arms.

In testimony that I claim the foregoing as my invention, I have signed my name in presence of two witnesses, this twenty-sixth day of March 1909.

REME A. BEAUSEJOUR.

Witnesses:
F. GEORGE BARRY,
HENRY THIEME.